United States Patent
Mori et al.

(10) Patent No.: US 7,016,967 B2
(45) Date of Patent: Mar. 21, 2006

(54) METHODOLOGY FOR FAST FILE TRANSFER PROTOCOL

(75) Inventors: Timothy T. Mori, Gardena, CA (US); Richard S. Brehove, Lomita, CA (US); Timothy A. Yokote, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 810 days.

(21) Appl. No.: 10/005,770

(22) Filed: Nov. 8, 2001

(65) Prior Publication Data
US 2003/0088688 A1    May 8, 2003

(51) Int. Cl.
*G06F 15/16*    (2006.01)
(52) U.S. Cl. .................. 709/230; 709/232; 709/233
(58) Field of Classification Search ................ 709/230, 709/236, 246, 232, 233
See application file for complete search history.

(56) References Cited

U.S. PATENT DOCUMENTS

| | | | |
|---|---|---|---|
| 5,315,544 A | 5/1994 | Yokote et al. | |
| 5,471,603 A | 11/1995 | Yokote et al. | |
| 5,553,083 A | 9/1996 | Miller et al. | |
| 5,651,129 A | 7/1997 | Yokote et al. | |
| 5,727,002 A | 3/1998 | Miller et al. | |
| 5,920,701 A | 7/1999 | Miller et al. | |
| 5,983,176 A * | 11/1999 | Hoffert et al. | 704/233 |
| 6,018,359 A * | 1/2000 | Kermode et al. | 725/101 |
| 6,067,108 A | 5/2000 | Yokote et al. | |
| 6,151,696 A | 11/2000 | Miller et al. | |
| 6,389,473 B1 * | 5/2002 | Carmel et al. | 709/231 |
| 6,536,043 B1 * | 3/2003 | Guedalia | 725/90 |
| 6,677,961 B1 * | 1/2004 | Bhat | 715/723 |
| 6,831,912 B1 * | 12/2004 | Sherman | 370/349 |
| 6,868,452 B1 * | 3/2005 | Eager et al. | 709/231 |

OTHER PUBLICATIONS

Richard Stevens, "TCP/IP Illustrated," Apr. 2000, Addison-Wesley, vol. 1, pp. 280-296.*

* cited by examiner

Primary Examiner—Zarni Maung
Assistant Examiner—Nghi V. Tran
(74) Attorney, Agent, or Firm—Tarolli, Sundheim, Covell & Tummino L.L.P.

(57) ABSTRACT

A methodology is provided for transferring a file from a first entity to a second entity over a network. The methodology may include receiving a first one of a plurality of blocks at the second entity, receiving a second one of said plurality of blocks at the second entity, receiving a last one of the plurality of blocks at the second entity, and assembling the first one of the plurality of blocks and the second one of the plurality of blocks into a single file at the second entity after receiving the last one of the plurality of blocks.

25 Claims, 5 Drawing Sheets

METHODOLOGY FOR FAST FILE TRANSFER PROTOCOL

BACKGROUND OF THE INVENTION

1. Field of the Invention

This invention relates to data transmission and more particularly relates to fast and reliable transmission of files from one computer system to another computer system.

2. Discussion of the Related Art

A common protocol for computer networks is TCP/IP, which is the protocol used on the Internet. TCP stands for Transmission Control Protocol, and IP stands for Internet Protocol. TCP is a transport protocol that is responsible for end-to-end delivery of information across an internetwork (i.e., a network of networks).

File Transfer Protocol (FTP) may run as an application on top of TCP. FTP may support point-to-point file transfers. FTP may also depend on TCP for reliable delivery as TCP is a connection-oriented acknowledged transport protocol.

Connection-oriented implies that TCP first establishes a connection between two systems that intend to exchange data. Since most networks are built on shared media (for example, several systems sharing the same cabling), it may be necessary to break data into manageable pieces so that no two communicating computers monopolize the network. These pieces may be called packets. When an application sends a message (file or data) to TCP for transmission, TCP may break the message into packets, sized appropriately for the network, and send the packets over the network.

Because a single message is often broken into many packets, TCP marks these packets with sequence numbers before sending them across the network. The sequence numbers allow the receiving system to properly reassemble the packets into the original message. Being able to reassemble the original message is not enough, as the accuracy of the data should be verified. TCP may accomplish this by computing a checksum. The checksum is a mathematical computation applied (by the sender) to the data contained in the TCP packet. The receiving system may perform the same calculation on the received data and compare the result with the checksum that the sending system computed. If the results match, then the receiving system may send an acknowledgment (ACK) back to the originating system (or sending system). If the results do not match, then the receiving system may ask the sending system to resend the packet.

TCP may also use port IDs to specify which application running on the system is sending or receiving the data. The port ID, checksum, and sequence number may be inserted into the TCP packet in a section called the header. The header is at the beginning of the packet containing this and other "control" information for TCP.

One problem with file transfers involves the length of time to transfer a file. For example, if one desires to transfer a file (such as a 2 Gigabyte file) across a latent network of great distance (such as between North America and Australia), then upwards of 20 to 40 hours may be needed to complete the total transfer of the file. This is due in part because it may take approximate 500 milliseconds for transmission of a packet and the return receipt of the acknowledgement back to the originating system. It is therefore desirable to speed up the file transfer time.

SUMMARY OF THE INVENTION

A method is provided for transferring a file over a network. This may include dividing a file into a plurality of blocks, transferring a first one of the plurality of blocks from a first entity and across the network toward a second entity. A second one of the plurality of blocks may be transmitted from the first entity and across the network toward the second entity while the first one of the plurality of blocks is being transferred across the network to the second entity.

A method may also be provided for transferring a file from a first entity to a second entity over a network. This may include receiving a first one of a plurality of blocks at the second entity, receiving a second one of the plurality of blocks at the second entity, receiving a last one of the plurality of blocks at the second entity, and assembling the first one of the plurality of blocks and the second one of the plurality of blocks into a single file at the second entity after receiving the last one of the plurality of blocks.

Embodiments of the present invention may utilize Transmission Control Protocol (TCP) for transmission of the plurality of blocks.

Other salient features of the invention will become apparent from the following detailed description taken in conjunction with the annexed drawings that disclose preferred embodiments of the invention.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto.

The following represents brief descriptions of the drawings in which like reference numerals represent like elements and wherein.

DETAILED DESCRIPTION OF PREFERRED EMBODIMENTS

In the following detailed description, like reference numerals and characters may be used to designate identical, corresponding, or similar components in differing drawing figures. Furthermore, in the detailed description to follow, example sizes/models/values/ranges may be given, although the present invention is not limited thereto. Well-known elements have not been shown within the drawing figures for simplicity of illustration and discussion and so as not to obscure the invention.

A method may be provided for transferring a file over a network. This may include dividing a file into a plurality of blocks, transferring a first one of the plurality of blocks from a first entity and across the network toward a second entity. The method may also include transferring a second one of the plurality of blocks from the first entity and across the network toward the second entity while the first one of the plurality of blocks is being transferred across the network to the second entity. This transmission may be done in accordance with a Transmission Control Protocol.

Figure 1:
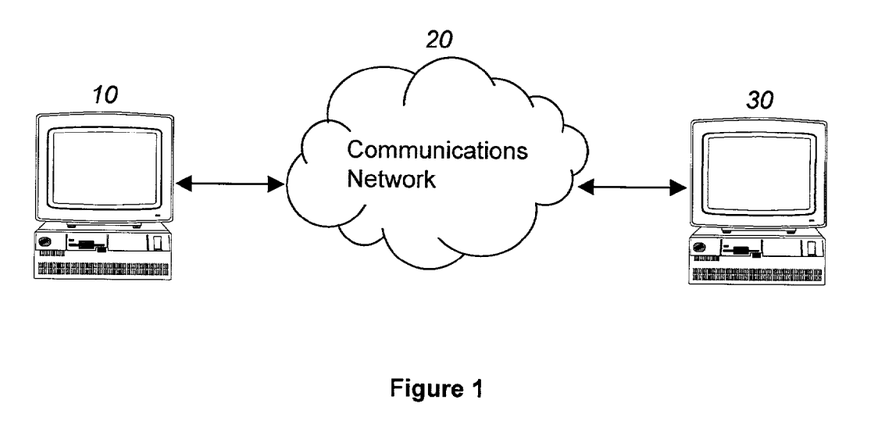
FIG. 1 illustrates two computer systems coupled together by a communications network.

FIG. 1 illustrates a first computer system 10 and a second computer system 30 that may be coupled together by a communications network 20 such as a latent network. For example, the communications network 20 may be a computer network (e.g., a LAN, a WAN or the internet), a wireless network (e.g., a cellular data network), some combination of these two types of communication mediums or some other communication medium.

As one example that will be used in the following discussion, the first computer system 10 may be provided within North America and the second computer system 30 may be provided within Australia. Thus, the first computer system 10 and the second computer system 30 may be separated by a considerable distance. The communications network 20 may be a satellite link or a landline, for example.

Figure 2:
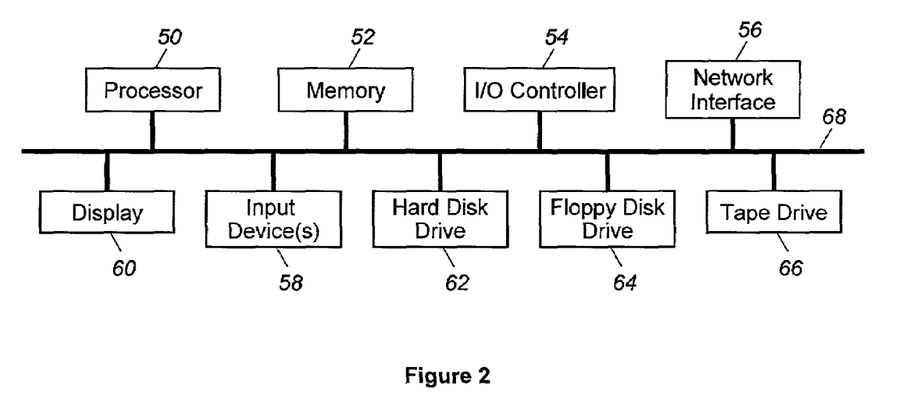
FIG. 2 is a block diagram of a computer system in which at least a portion of the present invention may be embodied.

FIG. 2 is a block diagram of a computer system (such as the first computer system 10 or the second computer system 30) in which a portion of the present invention may be embodied. Other embodiments and configurations of the computer system are also within the scope of the present invention. More particularly, each of the computer systems 10 and 30 may be computers such as PCs or workstations running on any of a variety of operating systems. The computer system may include a processor unit 50, a main memory unit 52 for storing programs and/or data, an input/output controller 54, a network interface 56, one or more input devices 58 (such as a keyboard and the mouse), a display device 60, a fixed or hard disk drive unit 62, a floppy disk unit 64, a tape drive unit 66 and a data bus 68 coupling these components to allow communication therebetween. The configuration of the computer system is not limited to the configuration shown in FIG. 2.

One or more computer programs may define the operational capabilities of the computer system. The computer programs may be loaded into a computer system via the hard drive 62, the floppy drive 64 and/or the tape drive 66. Alternatively, the computer programs may reside in a permanent memory location (e.g., a ROM chip) of the main memory 52.

Figure 3:
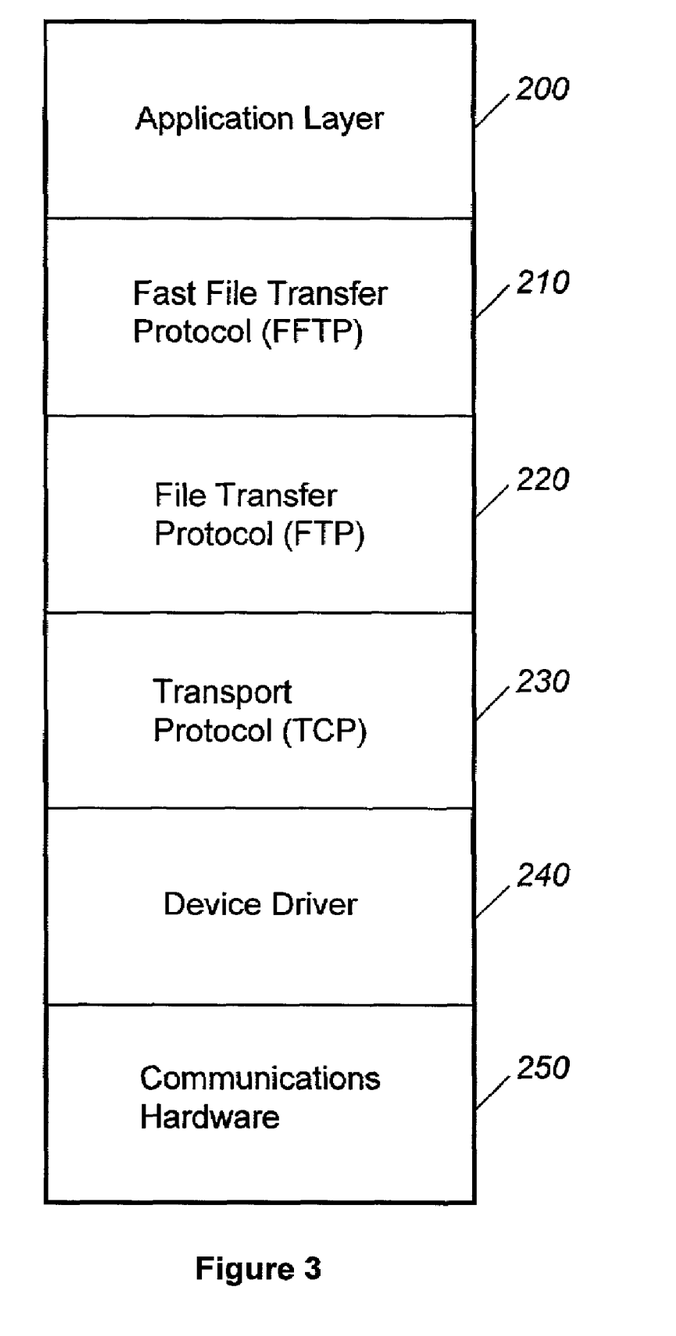
FIG. 3 illustrates various layers of the computer system used for fast file transfer protocol in accordance with an example embodiment of the present invention.

FIG. 3 illustrates various layers of the computer system in the software and the hardware in accordance with an example embodiment of the present invention. Other embodiments are also within the scope of the present invention. More specifically, FIG. 3 shows an application layer 200, a fast file transfer protocol (FFTP) layer 210, a file transfer protocol (FTP) layer 220, a transport protocol (TCP) layer 230, a device driver 240 and communications hardware 250. As is well known, the communications hardware 250 may be the physical means of sending data over lines (i.e., the electrical, mechanical and functional control of data circuits). The transport protocol layer 230 and the file transfer protocol layer 220 may also correspond to well known layers in the art. The application layer 200 may contain functions for particular application services such as file transfer, remote file access and virtual terminals. Embodiments of the present invention may be provided within the fast file transfer protocol layer 210 although embodiments may also be provided within the application layer 200. The fast file transfer protocol layer 210 may be provided within the first computer system 10 and the second computer system 30 (and any other relevant computer system). The fast file transfer protocol layer 210 may be software containing program instructions to perform features of the present invention as will be described below.

As discussed above, one problem with FTP is that latent networks reduce the FTP transfer rates. That is, a file transfer over a latent network may involve the sending of packets from the originating system (such as the first computer system 10) and the transmission of an acknowledgment back to the originating system before subsequent packets can be sent from the originating system. This process may be slowed down due to the higher latency on the network thereby increasing the waiting time for acknowledgements.

Embodiments of the present invention may divide (or break) a large file (such as a data file or program file) into multiple pieces (or blocks) and transfer each of the blocks over the network, rather than executing a single transfer of a large file. Any of several well-known FTP applications may be used to transmit the blocks across the network. The blocks may be reassembled at the receiving system (such as the computer system 30) after they have been transferred. The software may be written so as to control the activity of the transfer and the rebuilding of the file blocks (or pieces).

The files may correspond to any number of types of files including data files, program files and visual files. Embodiments of the present invention are applicable to full motion visual products including the audio and video content. U.S. patent application Ser. No. 09/536,110, filed Mar. 24, 2000 (entitled "Integrated Digital Production Line For Full-Motion Visual Products"), the subject matter of which is incorporated herein by reference, discloses a process and apparatus for managing visual content over a network. Embodiments of the present invention may be incorporated within the disclosed arrangements of that application.

Fast FTP may be incorporated within software and may increase the relative bandwidth of a file transfer, which thereby decreases the time of the transfer. That is, fast FTP may take a file and break (or divide) it into multiple blocks (or pieces) where each block may be the same size, except the last block which may be slightly larger as will be described. Each block may be transferred one at a time with a set interval between each transfer. This interval allows the transfers to start at different times so as not to stress the system. The Internet Protocol (IP) address of the receiving system (such as the second computer system 30) may also be passed to the FFTP layer 210. The Internet Protocol (IP) address may inform the FFTP which system to send the file blocks. A small control file may also be transmitted to assist in assembly of the blocks at the receiving system. On the receiving system, a separate FFTP application may be launched to reassemble the transferred file. Therefore, when all the blocks of the file have reached the receiving system, the receiving system may recombine the blocks back into the original file. Stated differently, the FFTP may transfer multiple blocks (or pieces) of a file at a single time so as to fill up the available bandwidth or network capacity. Once a file (such as a 2 Gigabyte file) is broken into smaller blocks, a first block may be transmitted to the receiving system. A second block may be transmitted to the receiving system after waiting a set interval from the transmission of the first block. The set interval may be to avoid overloading the processor. The first computer system 10 may transfer a third block after waiting a set interval from the transmission of the second block. This process may continue until all the blocks of the file have been transferred to the receiving system (such as the second computer system 30).

By utilizing embodiments of the present invention, the TCP layer 230 does not change its normal operational mode. That is, the TCP layer 230 still waits for acknowledgments from the second computer system 30 regarding the transmitted packets. However, embodiments of the present invention more effectively utilize the available bandwidth by starting block transmission at slightly different times and by "simultaneously" transmitting blocks across the network.

The last block of a file may be an intercontrol block that contains information regarding the transferred file such as the file size, the correct bit length and all the other pieces. Embodiments of the present invention are also applicable to the intercontrol block being other than the last block of the file. When all the pieces of a respective file are received at the second computer system 30, then the second computer system 30 may reassemble the blocks and present the reassembled file to the user application. This may be accomplished by the routines within the software of the second computer system 30.

Figure 4:
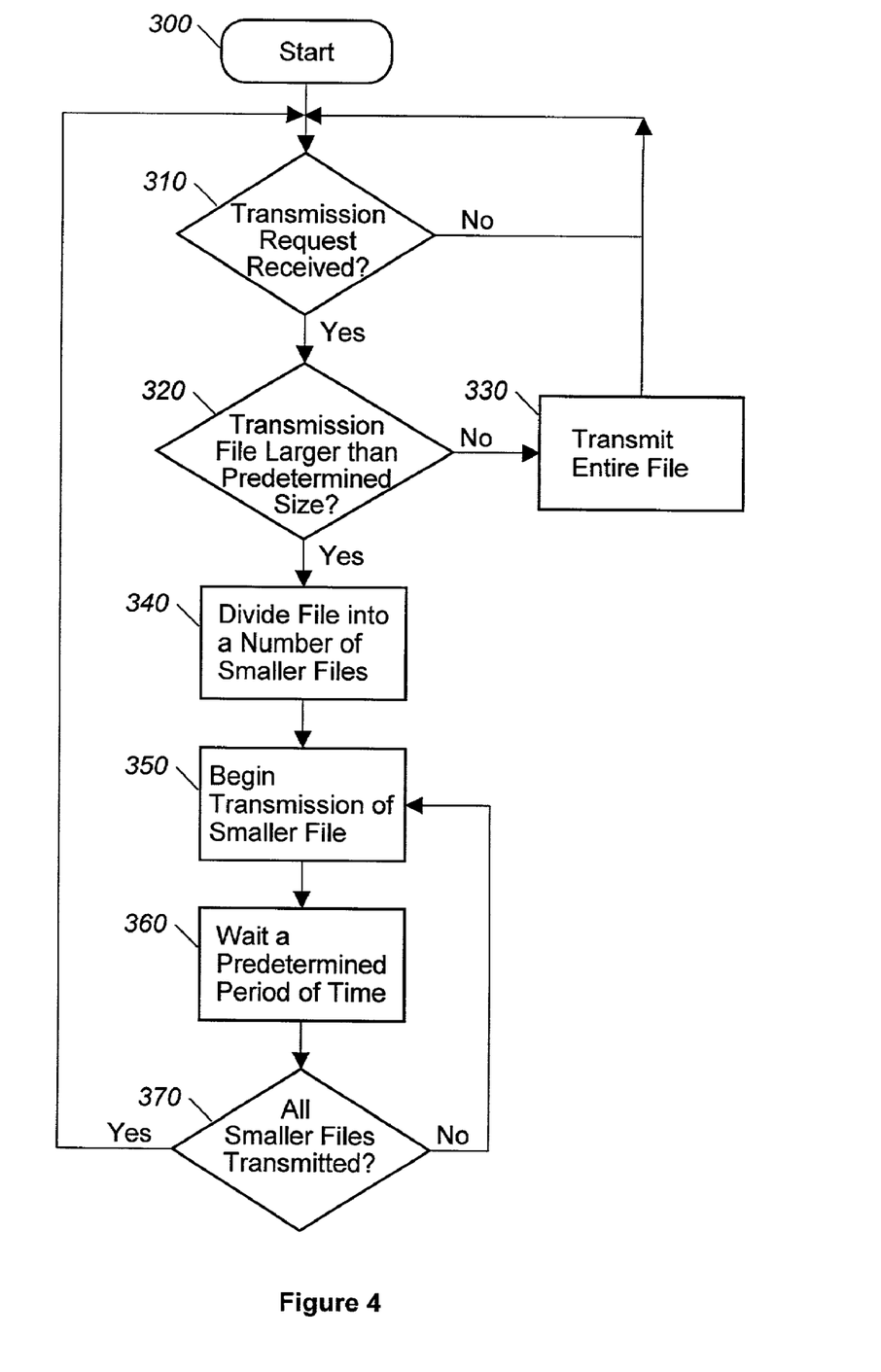
FIG. 4 is a flowchart illustrating a method for transmitting a file in accordance with an example embodiment of the present invention.

FIG. 4 is a flowchart illustrating a method for transmitting a file in accordance with an example embodiment of the present invention. Other orders of operation and embodiments are also within the scope of the present invention. The method shown in FIG. 4 may be performed by software within the computer system 10 (such as in the FFTP layer 210). More specifically, the method may start (at operation 300) and wait until a transmission request is received (operation 310). If a transmission request is received in operation 310, then the system may proceed to determine whether the transmission file is larger than a predetermined size in operation 320. If the transmission file is not larger than the predetermined size in operation 320, then the entire file may be transmitted in operation 330. On the other hand, if the transmission file is larger than the predetermined size in operation 320, then the file may be divided (or broken down) into a number of smaller files (or blocks) in operation 340. The smaller file may be transmitted in operation 350. The system may wait a predetermined period of time (in operation 360) before transmitting another small file. In operation 370, the system may determine if there are any other small files to be transmitted. If there are small files (or blocks) to be transmitted in operation 370, then another small file may be transmitted in operation 350. The operations 350, 360 and 370 may be repeated until all the small files have been transmitted. For example, a first small file may be initially transmitted from the first computer system 10. The first computer system 10 may wait a predetermined amount of time before transmitting a second small file. The first computer system 10 may subsequently wait a further predetermined amount of time from the transmission of the second small file until beginning transmission of a third small file. This cycle may continue until the last block (such as the interconnect block) of the file is transmitted from the first computer system 10 to the second computer system 30. Once all the small files have been transmitted, the operation may return back to operation 310 to wait for a subsequent transmission request.

The above method was described with respect to a predetermined time period between each transmission. Embodiments of the present invention are also applicable to a different amount of waiting time between each of the respective transmissions. Additionally, the predetermined period of time may be measured from the end of the previous transmission or from the beginning of the previous transmission. Still further, the system may transmit each of the small files based on a predetermined time schedule from an initial starting point.

Figure 5:
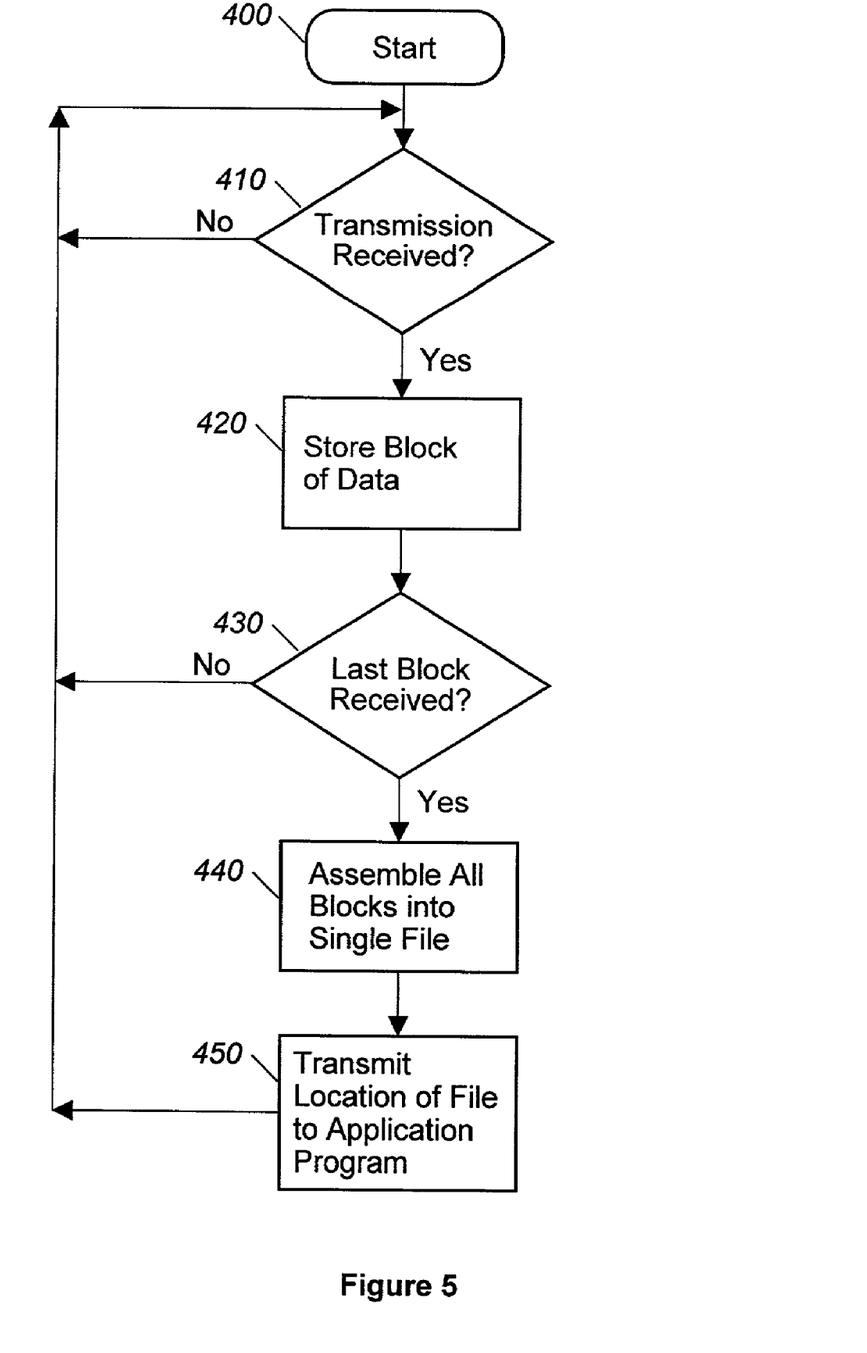
FIG. 5 is a flowchart illustrating a method for receiving a file in accordance with an example embodiment of the present invention.

FIG. 5 is a flowchart illustrating a method for receiving data in accordance with an example embodiment of the present invention. Other orders of operation and embodiments are also within the scope of the present invention. The method shown in FIG. 5 may be performed by software within the second computer system 30 (such as in the FFTP layer 210). More specifically, the method may start (at operation 400) by receiving a transmission at the second computer system 30 in operation 410. The second computer system 30 may store a received block of data in operation 420. The second computer system 30 may make a determination of whether a last block is received in operation 430. If the last block is received in operation 430, then the second computer system 30 may assemble all the blocks into a single file in operation 440. The FFTP layer 210 may transmit the location of the file to the application program in operation 450. On the other hand, if the last block is not received in operation 430, then the method may return to the operation 410 in which a subsequent block transmission may be received.

Stated differently, the receiving system may receive the first block and determine if all the transmissions have been received. If the last block has not been received, then a second block may subsequently be received. Once all the blocks have been received at the receiving system, then the blocks may be assembled into a single file.

Accordingly, embodiments of the present invention may provide a fast file transfer protocol (FFTP) methodology that speeds up file transfers by "simultaneously" transferring portions of a file. Simultaneously may refer to the successive transmissions of the files (or blocks) across the network. Fast FTP may be scaleable because it uses standard file transfer protocols and can be run on a PC. Fast FTP may also be used within a virtual private network (VPN) to protect data being transferred.

Embodiments of the present invention may use more of the available bandwidth than previous file transferring methodologies. The methodology does not wait for sequential acknowledgments before transmitting subsequent portions of the file. That is, because the methodology operates in a multi-thread manner (by sending multiple blocks of data), the methodology does not wait for each sequential acknowledgement even though the system does receive multiple acknowledgements that may or may not be in sequential order. The fast FTP methodology may move data at all times rather than waiting for sequential acknowledgments during the long length of time to transfer the entire file.

Any reference in the above description to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the knowledge of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

Further, embodiments of the present invention or portions of embodiments of the present invention may be practiced as a software invention, implemented in the form of a machine-readable medium having stored thereon at least one sequence of instructions that, when executed, causes a machine to effect the invention. With respect to the term "machine", such term should be construed broadly as encompassing all types of machines, e.g., a non-exhaustive listing including: computing machines, non-computing machines, communication machines, etc. Similarly, with respect to the term "machine-readable medium", such term should be construed as encompassing a broad spectrum of mediums, e.g., a non-exhaustive listing including: magnetic medium (floppy disks, hard disks, magnetic tape, etc.), optical medium (CD-ROMs, DVD-ROMs, etc), etc.

Using the embodiments of the present invention it is possible to reduce the transmission time required for large files without resorting to the use of faster and more expensive communications equipment. Therefore, utilizing standard communications software and hardware a user would realize a significant improvement in communications performance when transmitting and receiving large files using the aforementioned embodiments of the present invention.

A machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method of transferring a file over a network comprising:
   dividing a file into a plurality of blocks;
   transferring a first one of said plurality of blocks from a first entity and across said network toward a second entity;
   transferring a second one of said plurality of blocks from said first entity and across said network toward said second entity while said first one of said plurality of blocks is being transferred across said network to said second entity;
   transferring a subsequent one of said plurality of blocks from said first entity across said network toward said second entity while at least one previous block is being transferred across said network to said second entity;
   repeating said transferring of said subsequent one of said plurality of blocks until all of said plurality of blocks have been transferred, wherein at least one of said plurality of blocks comprises an intercontrol block that contains information for rebuilding the file from said plurality of blocks; and
   wherein transferring said second one of said plurality of blocks comprises waiting a predetermined time after a beginning of transmission of said first one of said plurality of blocks.

2. The method of claim 1, wherein said method utilizes Transmission Control Protocol (TCP) for transmission of said first one of said plurality of blocks and for transmission of said second one of said plurality of blocks.

3. The method of claim 2, wherein said method further utilizes a file transfer protocol (FTP) methodology for transmission of said first one of said plurality of blocks and for transmission of said second one of said plurality of blocks.

4. The method of claim 1, wherein dividing said file comprises determining whether said file is larger than a predetermined size.

5. The method of claim 1, wherein transferring said second one of said plurality of blocks comprises waiting a predetermined time after transmission of said first one of said plurality of blocks.

6. The method of claim 1, further comprising receiving said first one of said plurality of blocks at said second entity.

7. The method of claim 6, further comprising receiving said second one of said plurality of blocks at said second entity.

8. The method of claim 7, further comprising assembling said plurality of blocks at said second entity.

9. The method of claim 8, wherein said plurality of blocks are assembled at said second entity after said second entity receives said intercontrol block from said first entity.

10. The method of claim 1, further comprising said second entity transferring an acknowledgement across said network to said first entity after a beginning of transmission of said second one of said plurality of blocks.

11. The method of claim 1, wherein said file comprises a video file.

12. A method for transferring a file from a first entity to a second entity over a network, said method comprising:
    dividing a file into a plurality of blocks;
    transferring a first one of said plurality of blocks from a first entity and across said network toward a second entity;
    transferring a second one of said plurality of blocks from said first entity to said second entity while said first one of said plurality of blocks is being transferred across said network to said second entity, wherein transferring said second one of said plurality of blocks comprises waiting a predetermined time after a beginning of transmission of said first one of said plurality of blocks;
    transmitting a last one of said plurality of blocks; and
    assembling said first one of said plurality of blocks and said second one of said plurality of blocks into a single file at said second entity after receiving said last one of said plurality of blocks wherein said at least one of said plurality of blocks comprises an intercontrol block that contains information for rebuilding the file form said plurality of blocks.

13. The method of claim 12, wherein said method utilizes Transmission Control Protocol (TCP) for transmission/reception of said first one of said plurality of blocks and for transmission/reception of said second one of said plurality of blocks.

14. The method of claim 13, wherein said method further utilizes a file transfer protocol (FTP) methodology for transmission/reception of said first one of said plurality of blocks and for transmission/reception of said second one of said plurality of blocks.

15. The method of claim 12, wherein said last one of said plurality of blocks comprises said intercontrol block.

16. The method of claim 12, further comprising said second entity transferring an acknowledgment across said network to said first entity after a beginning of transmission of said second one of said plurality of blocks.

17. The method of claim 12, wherein said file comprises a video file.

18. A method of transferring a file over a network comprising:
- dividing a file into a plurality of blocks;
- transferring a first one of said plurality of blocks from a first entity and across said network toward a second entity, said transferring being done in accordance with a Transmission Control Protocol;
- transferring a second one of said plurality of blocks from said first entity and across said network toward said second entity while said first one of said plurality of blocks is being transferred across said network to said second entity, said transferring of said second one of said plurality of blocks being done in accordance with said Transmission Control Protocol wherein transferring said second one of said plurality of blocks comprises waiting a predetermined time after a beginning of transmission of said first one of said plurality of blocks;
- transferring a subsequent one of said plurality of blocks from said first entity across said network toward said second entity while at least one previous block is being transferred across said network to said second entity; and
- repeating said transferring of said subsequent one of said plurality of blocks until all of said plurality of blocks have been transferred, wherein at least one of said plurality of blocks comprises an intercontrol block that contains information for rebuilding the file from said plurality of blocks.

19. The method of claim 16, wherein dividing said file comprises determining whether said file is larger than a predetermined size.

20. The method of claim 16, wherein transferring said second one of said plurality of blocks comprises waiting a predetermined time after transmission of said first one of said plurality of blocks.

21. The method of claim 16, further comprising said second entity transferring an acknowledgment across said network to said first entity after a beginning of transmission of said second one of said plurality of blocks.

22. The method of claim 16, wherein said file comprises a video file.

23. A program storage deice readably by machine, tangibly embodying a program of instructions executable by the machine to perform a method of transferring a file over a network, said method comprising:
- dividing a file into a plurality of blocks;
- transferring a first one of said plurality of blocks from a first entity and across said network toward a second entity; and
- transferring a second one of said plurality of blocks from said first entity and across said network toward said second entity while said first one of said plurality of blocks is being transferred across said network to said second entity wherein transferring said second one of said plurality of blocks comprises waiting a predetermined time after a beginning of transmission of said first one of said plurality of blocks;
- transferring a subsequent one of said plurality of blocks from said first entity across said network toward said second entity while at least one previous block is being transferred across said network to said second entity; and
- repeating said transferring of said subsequent one of said plurality of blocks until all of said plurality of blocks have been transferred, wherein at least one of said plurality of blocks comprises an intercontrol block that contains information for rebuilding the file from said plurality of blocks.

24. The program storage device of claim 23, wherein said method utilizes Transmission Control Protocol (TCP) for transmission of said first one of said plurality of blocks and for transmission of said second one of said plurality of blocks.

25. The program storage device of claim 24, wherein said method further utilizes a file transfer protocol (FTP) methodology for transmission of said first one of said plurality of blocks and for transmission of said second one of said plurality of blocks.

* * * * *

UNITED STATES PATENT AND TRADEMARK OFFICE
CERTIFICATE OF CORRECTION

PATENT NO. : 7,016,967 B2 Page 1 of 1
APPLICATION NO. : 10/005770
DATED : March 21, 2006
INVENTOR(S) : Timothy T. Mori et al.

It is certified that error appears in the above-identified patent and that said Letters Patent is hereby corrected as shown below:

Column 8, line 59, after "file" delete "form" and insert --from--.

Column 9, fine 5, after "blocks" delete "comprises" and insert --is--.

Column 9, line 41, after "claim" delete "16" and insert --18--.

Column 9, line 44, after "claim" delete "16" and insert --18--.

Column 10, line 1, after "claim" delete "16" and insert --18--.

Column 10, line 5, after "claim" delete "16" and insert --18--.

Column 10, line 15, after "entity;" delete "and".

Signed and Sealed this

Tenth Day of April, 2007

JON W. DUDAS
*Director of the United States Patent and Trademark Office*